US007972210B2

(12) United States Patent
Gallagher

(10) Patent No.: US 7,972,210 B2
(45) Date of Patent: Jul. 5, 2011

(54) ELECTRONIC SLOT MACHINE

(76) Inventor: Leo A. Gallagher, Agoura, CA (US)

( * ) Notice: Subject to any disclaimer, the term of this patent is extended or adjusted under 35 U.S.C. 154(b) by 805 days.

(21) Appl. No.: 11/481,555

(22) Filed: Jul. 6, 2006

(65) Prior Publication Data

US 2007/0010317 A1 Jan. 11, 2007

Related U.S. Application Data

(60) Provisional application No. 60/696,753, filed on Jul. 6, 2005.

(51) Int. Cl.
*A63F 13/00* (2006.01)

(52) U.S. Cl. ................ 463/31; 463/16; 463/20; 463/30; 463/34; 273/138.1; 273/139

(58) Field of Classification Search .............. 273/121 B, 273/120 A, 138.1, 138.2, 139, 141 A, 142 B, 273/142 C, 142 J; 463/1, 36, 42–43, 10–13, 463/16–21, 23, 25–27, 29–34; *A63F 13/00*
See application file for complete search history.

(56) References Cited

U.S. PATENT DOCUMENTS

| | | | | |
|---|---|---|---|---|
| 5,655,965 | A * | 8/1997 | Takemoto et al. | 463/20 |
| 5,833,536 | A * | 11/1998 | Davids et al. | 463/11 |
| 5,836,819 | A * | 11/1998 | Ugawa | 463/30 |
| 6,095,921 | A * | 8/2000 | Walker et al. | 463/20 |
| 6,270,411 | B1 * | 8/2001 | Gura et al. | 463/20 |
| 6,443,837 | B1 * | 9/2002 | Jaffe et al. | 463/16 |
| 6,551,187 | B1 * | 4/2003 | Jaffe | 463/20 |
| 6,554,704 | B2 * | 4/2003 | Nicastro et al. | 463/20 |
| 6,579,178 | B1 * | 6/2003 | Walker et al. | 463/20 |
| 6,656,040 | B1 * | 12/2003 | Brosnan et al. | 463/16 |
| 6,656,046 | B1 * | 12/2003 | Yoseloff et al. | 463/20 |
| 6,761,632 | B2 * | 7/2004 | Bansemer et al. | 463/16 |
| 6,786,818 | B1 * | 9/2004 | Rothschild et al. | 463/20 |
| 6,921,331 | B2 * | 7/2005 | Gatto et al. | 463/6 |
| 6,994,625 | B2 * | 2/2006 | Falciglia, Sr. | 463/20 |
| 7,160,187 | B2 * | 1/2007 | Loose et al. | 463/20 |
| 7,316,609 | B2 * | 1/2008 | Dunn et al. | 463/16 |
| 7,413,511 | B2 * | 8/2008 | Seelig et al. | 463/22 |
| 7,438,639 | B2 * | 10/2008 | Osawa | 463/20 |
| 7,445,547 | B2 * | 11/2008 | Suzuki | 463/16 |
| 7,695,365 | B2 * | 4/2010 | Casey | 463/20 |
| 7,874,900 | B2 * | 1/2011 | Ward et al. | 463/9 |
| 7,874,909 | B2 * | 1/2011 | Pryzby et al. | 463/20 |
| 2002/0119818 | A1 * | 8/2002 | Savio et al. | 463/20 |
| 2002/0151360 | A1 * | 10/2002 | Durham et al. | 463/30 |
| 2003/0064779 | A1 * | 4/2003 | Suda | 463/20 |
| 2003/0083120 | A1 * | 5/2003 | DeWall et al. | 463/16 |
| 2003/0119578 | A1 * | 6/2003 | Newson | 463/20 |
| 2004/0140612 | A1 * | 7/2004 | Sines et al. | 273/121 B |
| 2005/0049029 | A1 * | 3/2005 | Gazdic et al. | 463/20 |
| 2005/0130732 | A1 * | 6/2005 | Rothschild et al. | 463/20 |
| 2006/0154717 | A1 * | 7/2006 | Jackson | 463/20 |
| 2007/0207847 | A1 * | 9/2007 | Thomas | 463/17 |
| 2010/0225742 | A1 * | 9/2010 | Shelton et al. | 348/43 |

* cited by examiner

*Primary Examiner* — Arthur O. Hall

(74) *Attorney, Agent, or Firm* — Carlson, Gaskey & Olds, PC

(57) ABSTRACT

An improved slot machine provides a plurality of animated scenes, the outcomes of which determine whether the player has won. The slot machine provides some of the traditional elements of a slot machine but with improved entertainment replacing the spinning reels. Scenes may depict objects that are moving toward a line, which is reminiscent of the line in the traditional slot machine, but in this case represents something physical with which the objects interact. For example, the objects could be birds that are falling/flying down onto a wire. In another example, the objects are freely falling onto the ground or floor. The scenes depict several possible outcomes of the interaction between the objects. Based upon the resulting outcomes (e.g. matching outcomes, like a traditional slot machine) the player wins or loses.

52 Claims, 5 Drawing Sheets

ELECTRONIC SLOT MACHINE

This application claims priority to U.S. Provisional Application Ser. No. 60/696,753, filed Jul. 6, 2005.

BACKGROUND OF THE INVENTION

This invention relates to a slot machine with improved entertainment for the player.

Slot machines are among the most popular games at casinos. In early mechanical machines, the player inserts a coin or token into a slot and pulls a lever. The slot machine spins a plurality of reels (usually between three and five reels) each having a variety of symbols along their outer circumference. The player wins or loses depending upon whether the symbols that come to rest at the front of each reel match, usually above some "line" at the front of the slot machine. More particularly, the player wins or loses (or the amount that the player wins) depends upon how many of the reels resulted in matching symbols. The amount the player wins may also depend upon which symbols were matched.

The early slot machines were entirely mechanical. The random occurrence of each symbol was determined only by when the reels happened to come to a stop (or, more specifically, when they were braked to a stop). With the advent of electronics and microprocessors, the random selection was determined in electronic circuits. Electronic controls spun the reels and stopped them where the electronic circuits indicated that they should be stopped. In other words, the reels were simply a means of displaying the random output of the electronics and were not actually involved in the determination of the outcome.

In some slot machines, even the traditional mechanical reels have been replaced with less expensive, easier-to-maintain electronic video displays. However, for the most part, slot machine manufacturers have simply mimicked the old, mechanical slot machines. The video display displays rotating reels in an attempt to provide the player with the traditional look and feel of an old mechanical slot machine. Some machines have provided additional animation only in a "bonus" round, where a random activity, such as a fisherman randomly hooking fish with different values, is animated on the video display.

This may be acceptable for players who are only looking for a nostalgic slot machine experience; however, there are generations of potential slot machine players who grew up playing video games with much more complicated computer generated graphics. For these potential slot machine players, simply replicating the limitations of the old mechanical slot machines is unacceptable and uninteresting.

SUMMARY OF THE INVENTION

In one embodiment according to the present invention, an improved slot machine provides a plurality of animated scenes, the outcomes of which determine whether the player has won. The example shown provides some of the traditional elements of a slot machine but with improved entertainment replacing the spinning reels.

In the illustrated examples, the scenes depict objects that are moving toward a line, which is reminiscent of the line in the traditional slot machine, but in this case represents something physical with which the objects interact. For example, the objects could be birds that are falling/flying down onto a wire. In another example, the objects are freely falling onto the ground or floor. The scenes depict several possible outcomes of the interaction between the objects. The depiction of these outcomes is more entertaining that a spinning reel. Based upon the resulting outcomes (e.g. matching outcomes, like a traditional slot machine, or other arrangements of multiple outcomes) the player wins or loses. Thus, while keeping some of the traditional elements of a slot machine, the entertainment provided by the present invention is improved.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
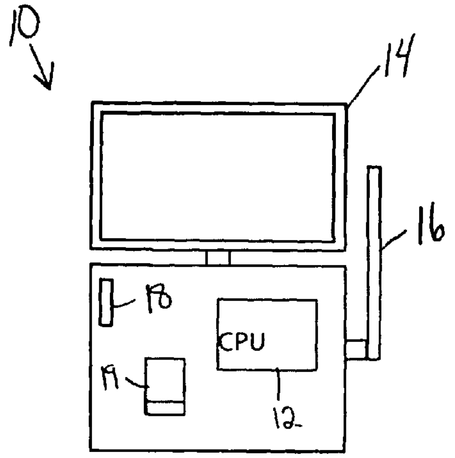
FIG. 1 is a schematic of a slot machine according to one embodiment of the present invention.

An improved electronic slot machine 10, such as is shown in FIG. 1, provides an electronic display 14 with innovative entertainment that retains some of the essential flavor of a slot machine game but is much more interesting than merely replicating the spinning reels of the mechanical slot machines.

Generally, the slot machine 10 includes a computer 12 having a microprocessor, memory, and storage and programmed to perform the functions described herein. The slot machine 10 further includes a display 14 such as a CRT, flat panel display, or other available reconfigurable display connected to an output of the computer 12. A user input 16 to the slot machine 10 (which is an input to the computer 12) may take the form of a traditional slot machine lever 16, or a simple electronic button, or a touch screen display. The slot machine 10 further includes a slot 18 for receiving coins or tokens from a player and a prize-dispensing chute 19. The slot 18 and chute 19 could be replaced with an electronic debit and credit system (such as a card or fob to which value can be credited and from which value can be debited) to handle the player's wager and the player's winnings.

The computer 12 provides an animated slot machine game on the display 14 as is illustrated in FIGS. 2-5. In general terms, the computer 12 provides a plurality of animated scenes 20 initiated by the user input 16 and having a plurality of randomly-occurring possible outcomes. Matching (or mixing) of the outcomes of the plurality of animated scenes 20 determines whether the player is a winner (and, optionally, how much the player wins).

Figure 2:
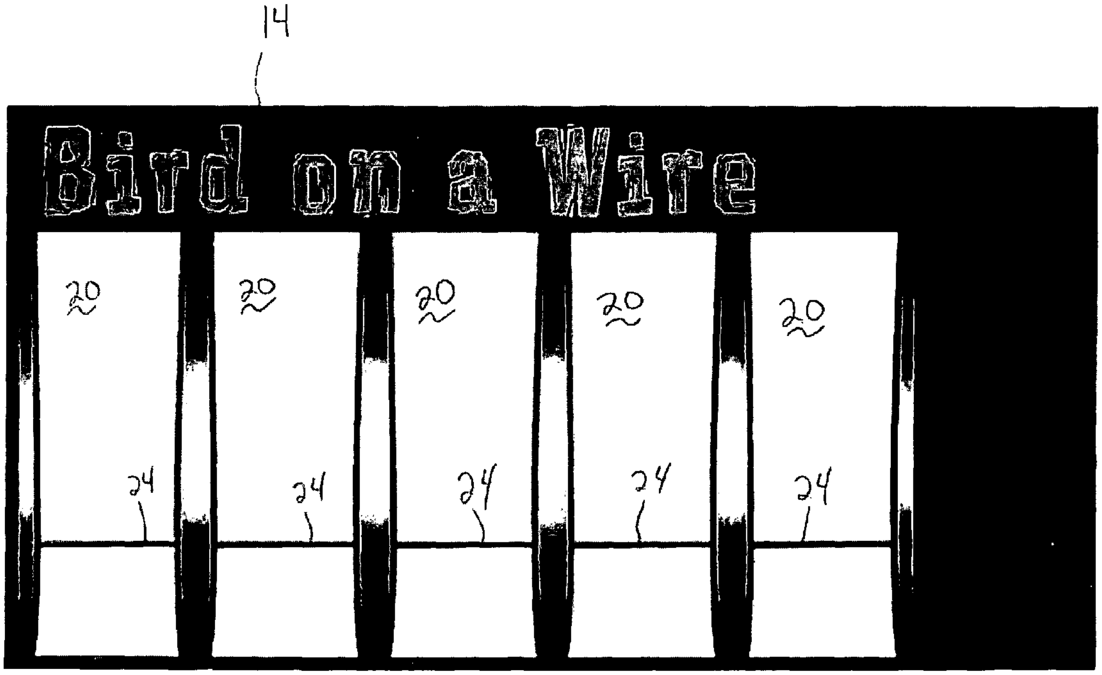
FIG. 2 illustrates an example first screen of the slot machine of FIG. 1.

Referring to FIG. 2, the animated scenes 20 are more entertaining than spinning wheels. In the embodiment shown, the motion in the animated scenes 20 is depicted as due to gravity (i.e. falling) rather than spinning. Additionally, the "line" that indicates the final resting position for the symbols on the traditional spinning reel slot machine is replaced by a "line" that represents a real object that interacts in the animation. For example, the "line" may be the ground, or the floor, or, as in the example shown, the "line" is a wire 24. Although other objects could be used in this invention, the "line" is reminiscent of the line present in many traditional slot machines. In this example, five animated scenes 20 are shown on the display 14. The animated scenes 20 may progress and resolve simultaneously or sequentially, or some or all of the animated scenes 20 may randomly change between simultaneous and sequential.

Figure 3:
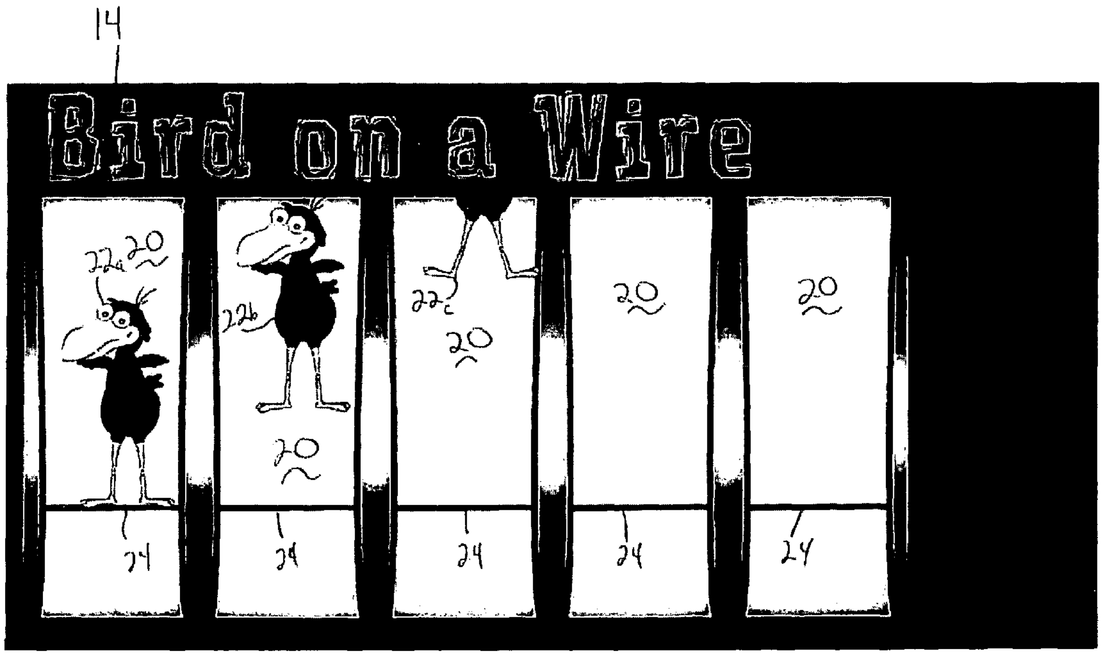
FIG. 3 illustrates a second screen of the slot machine of FIG. 1.
Figure 4:
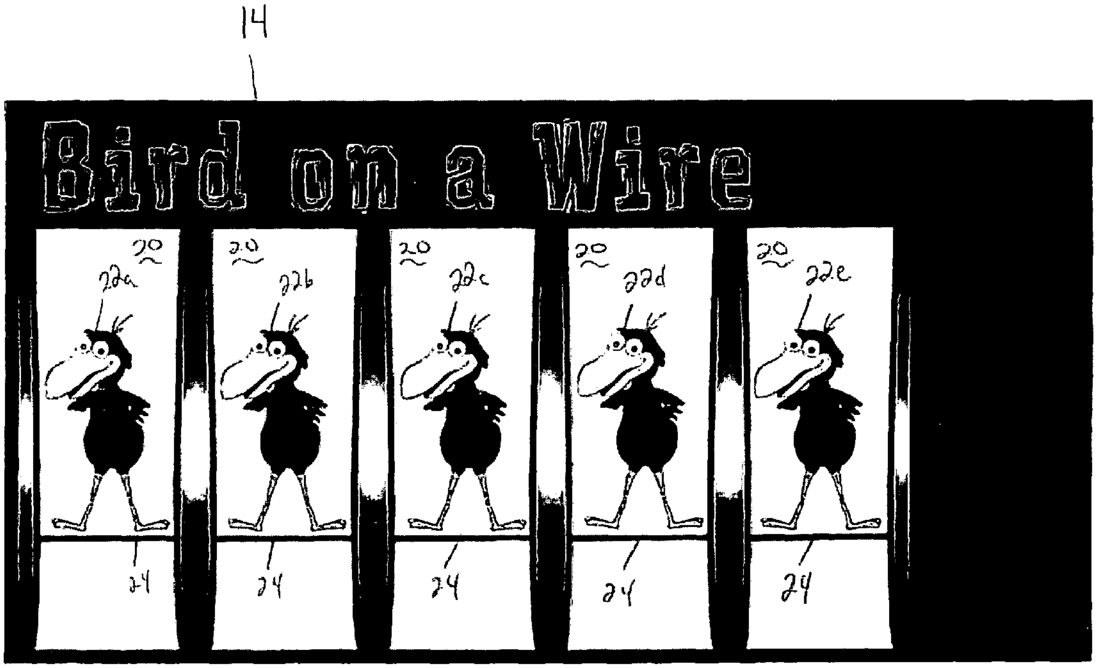
FIG. 4 illustrates a third screen of the slot machine of FIG. 1.
Figure 5:
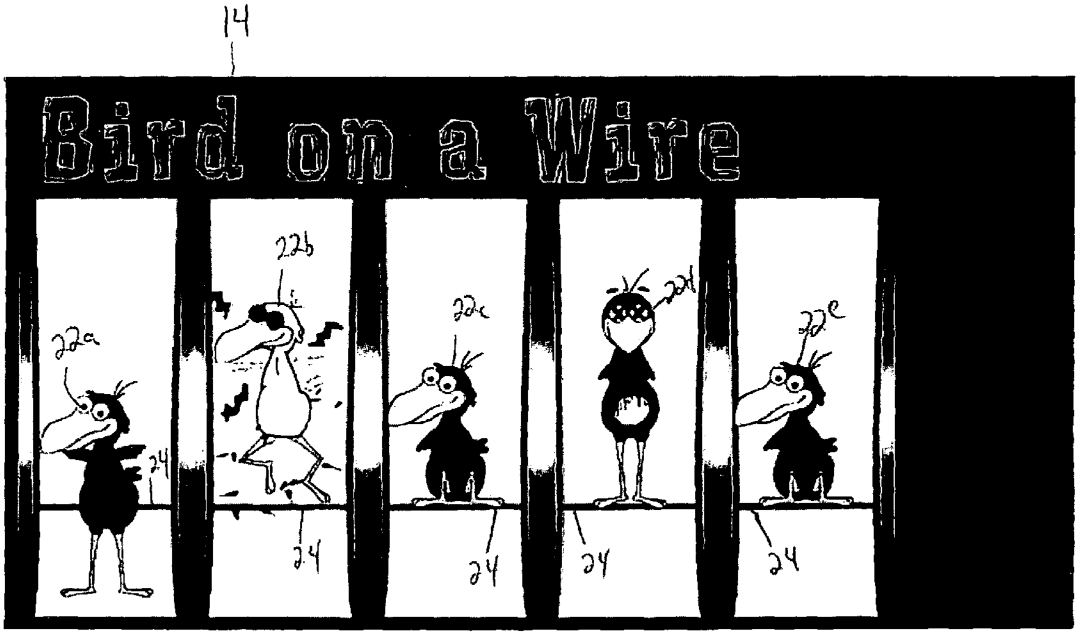
FIG. 5 illustrates a fourth screen of the slot machine of FIG. 1.

Referring to FIG. 3, the animated scenes 20 in this example are birds 22 flying down (i.e. falling) to a wire 24 (the "line"). In each animated scene 20, a bird 22 flies down to the wire 24 and randomly resolves to one of a plurality of possible outcomes. As shown in FIG. 3, the birds 22 may fly down sequentially across the animated scenes 20, in order to increase the suspense, until all of the birds 22 are standing on the wire 24, as shown in FIG. 4.

The animated scenes 20 are then each resolved either simultaneously, or sequentially, either after all the birds 22 have landed on the wire 24 or as each bird 22 lands on the wire 24. The possible resolutions shown include: the bird 22*a* falls past the wire, the bird 22*b* lands on the wire 24 and is electrocuted, the bird 22*c*, e lands on the wire 24 and sits on the wire 24, the bird 22*d* lands on the wire 24 and is shot by a bullet. The resolutions of these animated scenes 20 are illustrated for examples only. Other resolutions of animated scenes 20 could be used as well.

Only after all of the animated scenes 20 are resolved does the slot machine 10 indicate whether the player has won and, if so, how much the player has won. The winnings may be dispensed via chute 19 (FIG. 1) or otherwise credited to the player.

Figure 6:
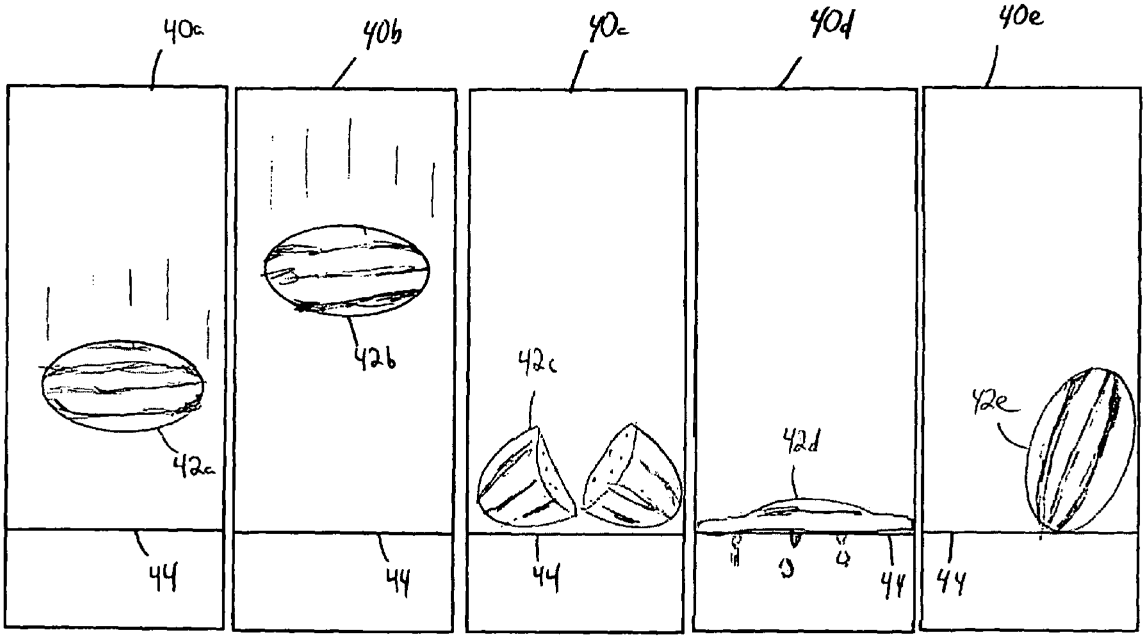
FIG. 6 illustrates a plurality of alternate animated scenes for the slot machine of FIG. 1.

FIGS. 2-5 are only an example of the animated scenes 20 in the slot machine 10. More animated scenes 40*a*-*e* are shown in FIG. 6, where watermelons 42*a*-*e* fall to the floor 44 (the "line"). The animated scenes 40*a*-*e* resolve what happens to each watermelon 42*a*-*e* (again, sequentially or simultaneously). For example. The watermelon 42*c* could simply break in half, or the watermelon 42*d* could completely disintegrate, or the watermelon 42*e* could bounce and remain wholly intact. Whether and how much the player wins depends upon matching (or mixing) the resolution of each animated scene 40*a*-*e*, as in the first example.

Other animated scenes 20 that are contemplated include falling people and falling animals, but the invention is not limited to the specific examples given. The slot machine 10 could display different animated scenes 20, 40 each time it is played or the different animated scenes 20, 40 could depend upon how much is wagered.

The slot machine 10 of the present invention provides better entertainment to the player during each game play, while still providing some of the essential flavor of a slot machine. Note that the term "slot machine" as used herein does not actually require a "slot" for receiving coins or tokens, or a physical lever, although they seem to be preferred by some customers. The "animated" scenes could be full-motion video or artistically-created animations. The slot machine 10 could even be implemented on an internet website with an animated lever, slot and chute and with payment and wagering provided via credit card.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. An electronic gaming device comprising:

a user input device;

a display; and a controller programmed to receive an input from the user input device and to display a plurality of scenes that do not intersect on the display based upon the input, the scenes each including a video having a randomly selected outcome that completes the scene, the controller determining whether a win has occurred based upon the randomly selected outcomes of the plurality of scenes, wherein each of the plurality of scenes depicts a first object in motion and a second object that interacts with the first object, wherein the second object is depicted as a line and wherein the randomly selected outcomes indicate the result of the interaction of the first object with the second object.

2. The electronic gaming device of claim 1 wherein the first object is depicted as being in motion due to gravity.

3. The electronic gaming device of claim 2 wherein the first object falls due to gravity in order to interact with the second object.

4. The electronic gaming device of claim 3 wherein the plurality of scenes each depict a linear story.

5. The electronic gaming device of claim 3 wherein the interaction of the first object with the second object is an end of the plurality of scenes.

6. The electronic gaming device of claim 1 wherein the second object is a ground or floor.

7. The electronic gaming device of claim 6 wherein in at least one of the plurality of randomly selected outcomes, the first object interacts with the second object by breaking.

8. The electronic gaming device of claim 6 wherein in at least one of the plurality of randomly selected outcomes, the first object interacts with the second object by ceasing its motion after contact between the first object and the second object.

9. The electronic gaming device of claim 8 wherein the first object is a watermelon.

10. The electronic gaming device of claim 1 wherein the second object is a wire.

11. The electronic gaming device of claim 10 wherein the first object is a bird.

12. The electronic gaming device of claim 1 wherein the user input device is a lever.

13. The electronic gaming device of claim 1 wherein the controller is programmed to register a wager or payment and wherein the controller generates the plurality of scenes in response to registering the wager or payment.

14. The electronic gaming device of claim 13 wherein the controller is programmed to generate a payment based upon the plurality of randomly selected outcomes.

15. The electronic gaming device of claim 14 wherein an amount of the payment is based upon the plurality of randomly selected outcomes of the plurality of scenes in response to the user input.

16. The electronic gaming device of claim 15 wherein the controller initiates the payment and the payment is made by coins or tokens by the electronic gaming device in response to the controller initiation.

17. The electronic gaming device of claim 1 wherein the display is an electronic display, the controller is a computer and wherein the computer indicates on the electronic display whether the win has occurred.

18. The electronic gaming device of claim 1 wherein the first object is one of a plurality of first objects, each interacting with the second object in one of the plurality of scenes.

19. The electronic gaming device of claim 18 wherein in at least one of the plurality of randomly selected outcomes, the first object interacts with the second object by breaking.

20. The electronic gaming device of claim 1 wherein the win occurs when at least two of the plurality of scenes match.

21. The electronic gaming device of claim 1 wherein the randomly occurring outcomes of the plurality of scenes occur simultaneously.

22. The electronic gaming device of claim 1 wherein the win is determined independent of the order of randomly selected outcomes of the plurality of scenes.

23. The electronic gaming device of claim 1 wherein each of the plurality of scenes are laterally offset from each other.

24. The electronic gaming device of claim 1 wherein the same first object appears in each of the plurality of scenes.

25. The electronic gaming device of claim 1 wherein the plurality of scenes each depict a linear story.

26. The electronic gaming device of claim 25 wherein the interaction of the first object with the second object is an end of the plurality of scenes.

27. The electronic gaming device of claim 1 wherein the interaction of the first object with the second object is an end of the plurality of scenes.

28. A method for playing a game of chance including the steps of:

a) receiving a user input signal by a computer;

b) generating by the computer on a display a plurality of scenes laterally offset from each other based upon the user input signal, the plurality of scenes each including a video having a randomly selected outcome that completes the scene, wherein each of the plurality of scenes depicts a first object in motion due to gravity and a second object interacting with the first object, wherein the second object is depicted as a static object, and wherein the plurality of randomly selected outcomes indicate the result of the interaction of the first object with the second object; and c) determining whether a win has occurred based upon the randomly selected outcomes of the plurality of scenes by the computer.

29. The method of claim 28 wherein said step b) includes depicting the second object as a line.

30. The method of claim 29 wherein the second object is a ground or floor.

31. The method of claim 30 wherein in at least one of the plurality of randomly selected outcomes, the first object interacts with the second object by breaking.

32. The method of claim 30 wherein in at least one of the plurality of randomly selected outcomes, the first object interacts with the second object by ceasing its motion after contact between the first object and the second object.

33. The method of claim 32 wherein the first object is a watermelon.

34. The method of claim 29 wherein the second object is a wire.

35. The method of claim 34 wherein the first object is a bird.

36. The method of claim 28 wherein the user input device is a lever.

37. The method of claim 28 further including the step of receiving a wager or payment, and wherein said step b) is performed in response to registering the wager or payment.

38. The method of claim 37 further including the step of generating a payment based upon the plurality of randomly selected outcomes.

39. The method of claim 38 wherein an amount of the payment is based upon the plurality of randomly selected outcomes of the plurality of scenes in response to the user input.

40. The method of claim 38 further including the step of making the payment in coins or tokens.

41. The method of claim 28 wherein the plurality of scenes do not intersect.

42. The method of claim 28 wherein determining whether the win has occurred in said step c) is independent of the order of randomly selected outcomes of the plurality of scenes.

43. The method of claim 28 wherein the plurality of scenes each depict a linear story.

44. The method of claim 43 wherein the interaction of the first object with the second object is an end of the plurality of scenes.

45. The method of claim 28 wherein the interaction of the first object with the second object is an end of the plurality of scenes.

46. A non-transitory computer readable medium storing a computer program which when executed by a computer performs the steps of:

a) receiving a user input signal;

b) generating a plurality of nonintersecting scenes based upon the user input signal, the a plurality of nonintersecting scenes each including a video having a randomly selected outcome, wherein each of the a plurality of nonintersecting scenes depicts a linear story having the randomly selected outcome which completes the scene, wherein the linear story depicts a first object in motion and a static second object that interacts with the first object, and wherein the randomly selected outcome depicts the result of the interaction of the second object with the first object; and c) determining whether a win has occurred based upon the randomly selected outcomes of the plurality of nonintersecting scenes.

47. The non-transitory computer readable medium of claim 46 wherein said step b) includes depicting the first object in motion due to gravity in each of the plurality of nonintersecting scenes.

48. The non-transitory computer readable medium of claim 47 wherein the computer further performs the step of receiving a wager or payment, and wherein said step b) is performed in response to registering the wager or payment.

49. The non-transitory computer readable medium of claim 48 wherein the computer further performs the step of generating a payment based upon the plurality of randomly selected outcomes.

50. The non-transitory computer readable medium of claim 46 wherein the computer further performs the step of displaying on a display whether the win has occurred.

51. The non-transitory computer readable medium of claim 46 wherein determining whether the win has occurred in said step c) is independent of the order of randomly selected outcomes of the plurality of nonintersecting scenes.

52. The non-transitory computer readable medium of claim 46 wherein each of the plurality of nonintersecting scenes are laterally offset from each other.

* * * * *